United States Patent [19]
DeMartin

[11] Patent Number: 4,916,972
[45] Date of Patent: Apr. 17, 1990

[54] BICYCLE PEDAL AND SHOE CLIP

[75] Inventor: Antonio DeMartin, Ponte Della Priula, Italy

[73] Assignee: Quik-Dam Srl, Ispica, Italy

[21] Appl. No.: 314,795

[22] Filed: Feb. 24, 1989

[30] Foreign Application Priority Data

Mar. 8, 1988 [IT] Italy .................. 82523 A/88

[51] Int. Cl.$^4$ ............................................. G05G 1/14
[52] U.S. Cl. .................................. 74/594.6; 74/594.4
[58] Field of Search ............ 74/594.4, 594.6, 560; 36/131, 132, 36 R; D12/125

[56] References Cited

U.S. PATENT DOCUMENTS

| | | | |
|---|---|---|---|
| 598,325 | 2/1898 | McIntyre | 74/594.6 |
| 2,582,551 | 1/1952 | Malherbe | 36/36 R |
| 4,089,236 | 5/1978 | Genzling | 74/594.4 |
| 4,214,384 | 7/1980 | Gonzalez | 74/594.6 X |
| 4,442,732 | 4/1984 | Okajima | 74/594.6 X |
| 4,807,368 | 2/1989 | Beyl | 36/131 X |

FOREIGN PATENT DOCUMENTS

| | | | |
|---|---|---|---|
| 0094276 | 11/1983 | European Pat. Off. | 36/131 |
| 0146218 | 6/1985 | European Pat. Off. | 74/594.6 |
| 2240102 | 2/1974 | Fed. Rep. of Germany | 74/594.6 |
| 3722192 | 1/1988 | Fed. Rep. of Germany | 74/594.6 |
| 2279607 | 2/1976 | France | 74/594.6 |

*Primary Examiner*—Vinh T. Luong
*Attorney, Agent, or Firm*—Leonard Bloom

[57] ABSTRACT

A pedal device for a bicycle is provided with an upper delimited longitudinal sliding guide. A sliding engagement device is also provided. This sliding engagement includes a slide that is inserted in a controlled sliding condition in the sliding guide of the pedal. An attachment device is provided to fix the sliding engagement device to the sole of the foot of the cyclist.

1 Claim, 1 Drawing Sheet

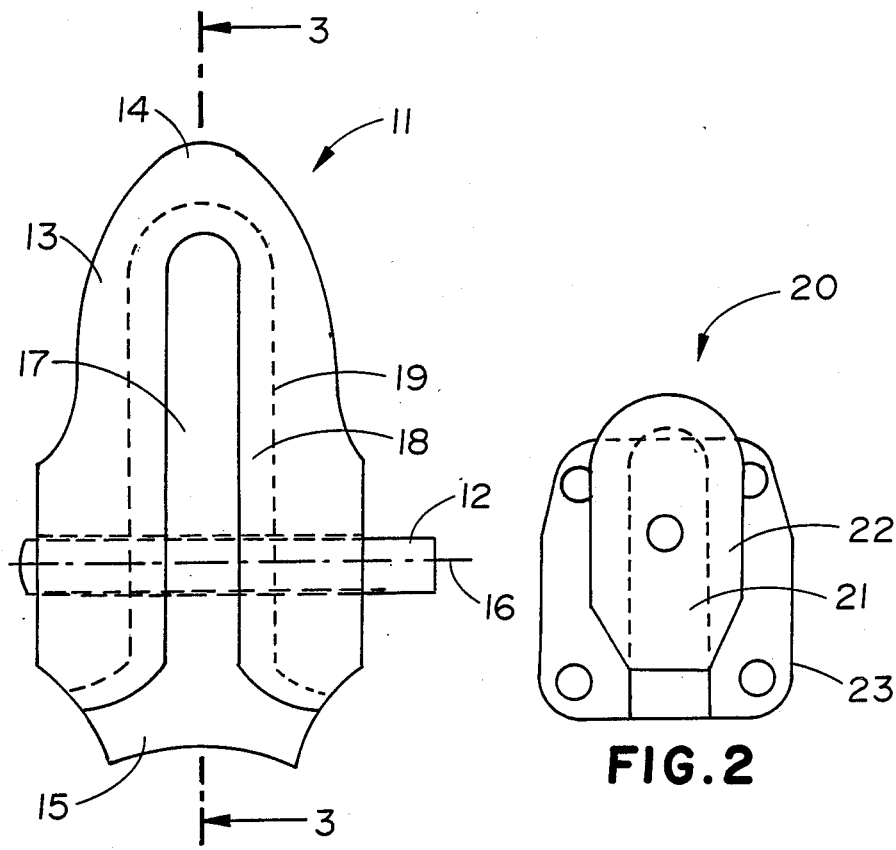
FIG. 1
FIG. 2
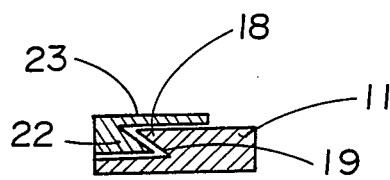
FIG. 4
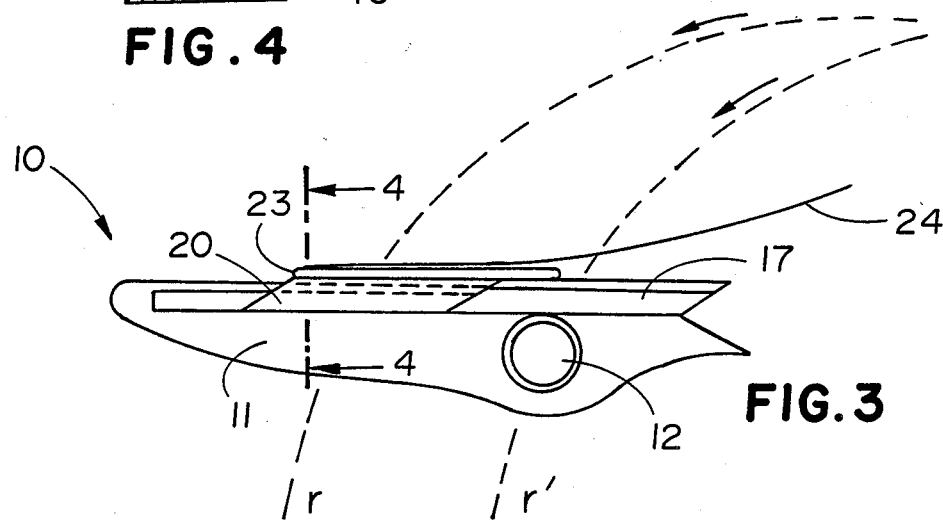
FIG. 3

BICYCLE PEDAL AND SHOE CLIP

FIELD OF THE INVENTION

The present invention relates to a pedal device for a bicycle. The invention further relates to shoe clips for mounting the pedals of this invention to the soles of the shoes of a cyclist.

BACKGROUND OF THE INVENTION

Bicycle pedals are known in the present state of art, being used as foot supporting surfaces and as means of transmitting force to a pedal crank which, in turn, engages the gear wheel. The pedals generally consist of an essentially rigid and rotationally idle rectangular structure which has an orthogonal pivoting axis that is arranged longitudinally on the respective pedal crank.

Alternate arrangements include devices that increase the performance of a bicycle by advancing the pedal in respect to the original pivoting point on the pedal crank. Such devices consist of a lever made up of a conveniently shaped rod where one end engages and slides on the bicycle's supporting frame and where the pedal crank is pivoted near the opposite end which terminates in a common pedal. Such arrangements permit the advancement of the pedal and, consequently, of the foot in respect to the original pivoting position on the pedal crank. Among the inconveniences to be found in such arrangements is the necessity to equip the bicycle with a lever that is not at all functional, as it produces poor results and wastes a considerable amount of energy which could be recuperated. Such an arrangement also hinders the cyclist's normal activity resulting in encumbered movements and, lastly, even in a minimum part, increases the weight of the bike.

SUMMARY OF THE INVENTION

The primary object of the present invention is to eliminate the above mentioned inconveniences.

This and other objects are achieved by the present invention which includes a pedal means having an upper delimited longitudinal sliding guide means formed therein, a sliding engagement means with:
sliding means inserted in a controlled sliding condition, in said sliding guide means of said pedal means; and
attaching means to fix said sliding engagement means to a sole, or to a support secured to a sole of the foot of the cyclist.

This arrangement allows advancement of the foot on the pedal, such that the application point of the force of the foot is advanced in respect to the position of the pivoting axis of the pedal on the respective pedal crank. In this fashion, a force, which develops with the pedalling pushing motion, is obtained along a circumference which is advanced in respect to the circumference made from the pivoting axis, and which develops in a measure that corresponds to the distance from the point of application of the push/pull of the foot to the pivoting point of the pedal on the pedal crank. Formed thusly, the pedal is a supporting structure for the foot that is pivoted orthogonally on the pedal crank, and in which the sliding guide means are provided with a means of engagement that is inserted in the sliding guide means and is associated with a sole of the shoe of a cyclist.

Advantageously, the sliding guide means formed in the pedal means is inverted "U" shape, having the closed end of the sliding guide means being directed forwardly.

This allows the easy insertion of the sliding engagement means and the easy disengagement thereof. The frontal closure (the closed end) provides further sure resistance.

In the preferred embodiment said sliding guide means of said pedal means is advanced in respect of the respective transversal pivoting axis of the crank.

The advantages obtained by the present invention are that it makes it possible to increment performances in parity to forces being used by over 20%, it does not involve an increase in weight, it is a device which is easy to install and utilize, it has a relatively low price and it does not require specialized parts in that it is usable on a common bicycle frame.

These and other advantages appear in the following detailed description of the preferential solutions for realization and from the attached drawings, the details of which are not to be held as limiting but are given only as examples.

BRIEF DESCRIPTION OF THE DRAWINGS

FIG. 1 is a plan view of a pedal means realized in a preferential solution with a delimited longitudinal sliding guide means formed therein.

FIG. 2 is a bottom plan view of a sliding engagement means for insertion in the sliding guide means of the pedal means of FIG. 1, and in which one portion thereof can be fixed to a shoe and in which an opposite portion is inserted into the delimited sliding guide means of the pedal means.

FIG. 3 is a cross section taken along lines 3—3 of FIG. 1 of the pedal showing the relative sliding engagement means associated to the sole of the shoe of a cyclist.

FIG. 4 is a cross section taken along lines 4—4 of FIG. 3 showing the details of the engagement between the pedal means and the sliding engagement means. cl DESCRIPTION OF THE PREFERRED EMBODIMENTS With reference to the respective figures, the present invention is an apparatus for allowing sliding of the foot, particularly on bicycle pedals. The apparatus includes a pedal means (A) that is pivoted on a respective pedal crank and a sliding engagement means (B) that has a sliding portion (5,5') that is removably inserted in a sliding guide slot (3) formed in the pedal means (A). The sliding engagement means also includes a plate portion (4, 6) that is or can be associated with the sole (S) of a shoe of a cyclist. The pedal means (A) is an oblong shaped structure fabricated in a sole block (1) in which a pivoting means (2) is sunk transversely (transversely received) in a position that is offset rearwardly from the center of the pedal means (A). This pivoting means (2) receives a respective pedal crank which transmits movement. Said sliding guide means (3) comprises a seat (3) which is formed in said block (1). The seat (3) is chamfered, such that a hollowing (3') is perimetrically defined about the seat (3), so that a sealing edge or lip (3") axially extends from the upper part of the supporting surface of said pedal (1) overlying a portion of the seat (3) located therebelow.

The sliding engagement means comprises a fin (5') that is formed extending outwardly from a plate (5). The fin (5') is received in the space defined below the sealing edge (3") when the plate (5) is inserted in the sliding guide (3). In this way, the advancement of the application point of the force of the foot is realized in respect to the pivoting of the transverse axis on the pedal crank. Thus, a force is obtained which develops along the circumference (r) while the transversal pivoting axis of the pedal still goes along circumference (r'). The diameter is unvariable in both circumferences because the advancement of the circumference (r) is equal to the measure corresponding to the distance from the point of application of the foot's push/pull to the pivoting point of the pedal on the pedal crank. Obviously, any convenient means to block the device in the desired advanced position of the foot may be provided on the pedal (A) and/or on the sliding engaging means (B). In one preferential embodiment, the pedal (A) is formed, so that one side of the receiving seat (3) is slightly widened and is flexible in order to facilitate, by a rotary movement of the foot, the position chosen.

What is claimed is:

1. A pedal device for a bicycle, the pedal device being comprised of:
 a pedal means having an upper delimited longitudinal sliding guide means formed therein;
 a sliding engagement means including a sliding means inserted in controlled sliding condition in the sliding guide means of the pedal means; and further including an attaching means to fix the sliding engagement means to the shoe of the cyclist; and
 wherein the sliding guide means of the pedal means is inverted "U" shape, having a closed end, the closed end of the sliding guide means directed forwardly.

* * * * *